(12) United States Patent
Pupeza et al.

(10) Patent No.: US 11,408,724 B2
(45) Date of Patent: Aug. 9, 2022

(54) INTERFEROMETRY WITH AN ACHROMATIC INTERFEROMETRIC SUPERPOSITION OF ELECTROMAGNETIC FIELDS

(71) Applicant: Max-Planck-Gesellschaft zur Foerderung der Wissenschaften e.V., Munich (DE)

(72) Inventors: Ioachim Pupeza, Tuerkenfeld (DE); Ferenc Krausz, Garching (DE); Theresa Buberl, Garching (DE)

(73) Assignee: MAX-PLANCK-GESELLSCHAFT ZUR FOERDERUNG DER WISSENSCHAFTEN E.V., Munich (DE)

( * ) Notice: Subject to any disclaimer, the term of this patent is extended or adjusted under 35 U.S.C. 154(b) by 0 days.

(21) Appl. No.: 17/260,212

(22) PCT Filed: Jul. 16, 2018

(86) PCT No.: PCT/EP2018/069229
§ 371 (c)(1),
(2) Date: Jan. 13, 2021

(87) PCT Pub. No.: WO2020/015809
PCT Pub. Date: Jan. 23, 2020

(65) Prior Publication Data
US 2021/0270596 A1    Sep. 2, 2021

(51) Int. Cl.
*G01B 9/02* (2022.01)
*G02B 27/10* (2006.01)

(52) U.S. Cl.
CPC ..... *G01B 9/02083* (2013.01); *G02B 27/1006* (2013.01); *G01B 2290/65* (2013.01)

(58) Field of Classification Search
CPC ..... G01J 3/4535; G01J 2009/0288; G01J 3/45
See application file for complete search history.

(56) References Cited

U.S. PATENT DOCUMENTS 9,812,846 B2    11/2017  Yun et al.
10,386,174 B2    8/2019  Berz
(Continued)

FOREIGN PATENT DOCUMENTS

CN          1875242 A     12/2006
CN        101806733 A      8/2010
(Continued)

OTHER PUBLICATIONS

Grahmann, Jan et al. "Tunable External Cavity Quantum Cascade Lasers (EC-QCL): an application field for MOEMS based scanning gratings". Proc. SPIE 8977, MOEMS and Miniaturized Systems XIII, 897708, Mar. 7, 2014. (Year: 2014).*

(Continued)

*Primary Examiner* — Michael A Lyons
(74) *Attorney, Agent, or Firm* — Caesar Rivise, PC

(57) ABSTRACT

An interferometer apparatus includes a beam splitter arranged for splitting an input beam into a first beam propagating along a first interferometer arm including a deflection mirror and a second beam propagating along a second interferometer arm including a deflection mirror. The first and second interferometer arms have an identical optical path length. A beam combiner is arranged for recombining the first and second beams into a constructive output and a destructive output. In the first interferometer arm compared with the second interferometer arm, one additional Fresnel reflection at an optically dense medium is provided and a propagation of the electromagnetic fields of the first and second beams, when recombined by the beam combiner, results in a wavelength-independent phase difference of $\pi$ between the contributions of the two interferometer arms to (Continued)

the destructive output. Furthermore, an interferometric measurement apparatus and an interferometric measurement method are described.

19 Claims, 5 Drawing Sheets

(56) References Cited

U.S. PATENT DOCUMENTS

| | | | | |
|---|---|---|---|---|
| 2001/0019415 | A1* | 9/2001 | Prikryl | G01J 9/02 356/498 |
| 2002/0176092 | A1* | 11/2002 | Deck | G01J 9/02 356/515 |
| 2005/0021243 | A1* | 1/2005 | Dantus | H01J 49/162 702/28 |
| 2010/0328648 | A1* | 12/2010 | Harrison | G01J 3/0232 356/51 |
| 2014/0192365 | A1* | 7/2014 | Mortada | G02B 27/14 356/521 |

FOREIGN PATENT DOCUMENTS

| | | |
|---|---|---|
| CN | 106716088 A | 5/2017 |
| JP | H08297009 A | 11/1996 |

OTHER PUBLICATIONS

Bar-Lev, "A Dual-Beam Infrared Interferometer-Spectrometer", Infrared Physics, vol. 7, pp. 93-98 (1967).
Beduhn et al., "Advantages of Dual-Beam Interferometry in Fourier Transform Infrared Spectrometry", Applied Spectroscopy, vol. 40, No. 5, pp. 628-632 (1986).
Bracewell, "Detecting nonsolar planets by spinning infrared interferometer", Nature, vol. 274, pp. 780-781 (1978).
Chandrasekhar et al., "Double-Beam Fourier Spectroscopy with Interferometric Background Compensation", Optics Communications, vol. 17, No. 1, pp. 106-110 (1976).
Coddington et al., "Time-domain spectroscopy of molecular free-induction decay in the infrared", Optics Letters, vol. 35, No. 9, pp. 1395-1397 (2010).
Dakin et al., "Progress with optical gas sensors using correlation spectroscopy", Sensors and Actuators, B29, pp. 87-93 (1995).
Fehrenbacher et al., "Free-running performance and full control of a passively phase-stable Er:fiber frequency comb", Optica, vol. 2, No. 10, pp. 917-923 (2015).
Gabor et al., A study of the performance of a nulling interferometer testbed preparatory to the Darwin mission, Astrophysics, Universite Paris Sud—Parix XI, 172 pages (2009).
Gay et al., "An interferometric method for coronography", C.R. Acad. Sci. Paris, t. 322, Serie II b, pp. 265-271 (1996).
Genzel et al., "A New Version of a Michelson Interferometer for Fourier Transform Infrared Spectroscopy", Infrared Physics, vol. 18, pp. 113-120 (1978).
George et al., "Achromatized Holographic Phase Shifter and Modulator", Optics Communications, vol. 67, No. 3, pp. 185-191 (1988).
Goncharov et al., "Broadband laser enhanced dual-beam interferometry", Optics Letters, vol. 37, No. 12, pp. 2406-2408 (2012).
Hansch et al., "Laser Frequency Stabilization by Polarization Spectroscopy of a Reflecting Reference Cavity", Optics Communications, vol. 35, No. 3, pp. 441-444 (1980).
Hayden et al., "A quantum cascade laser-based Mach-Zehnder interferometer for chemical sensing employing molecular absorption and dispersion", Applied Physics B, pp. 124-129 (2018).
Hicks et al., "Recent developments with the Visible Nulling Coronagraph", Proc. of SPIE, vol. 9907, pp. 990720-1-990720-9 (2016).
International Search Report for PCT/EP2018/069229, dated Feb. 18, 2019.
Krishnamurthy et al., "Characterization of thin polymer films using terahertz time-domain interferometry", Applied Physics Letters, vol. 79, No. 6, pp. 875-877 (2001).
Kuehl et al., "Dual-Beam Fourier Transform Infrared Spectrometer", Analytical Chemistry, vol. 50, No. 3, pp. 418-422 (1978).
Lanin et al., "Time-domain spectroscopy in the mid-infrared", Scientific Reports, vol. 4:6670, pp. 1-8 (2014).
Laubereau et al., "Vibrational dynamics of liquids and solids investigated by picosecond light pulses", Reviews of Modern Physics, vol. 50, No. 3, pp. 607-665 (1978).
Mawet et al., "Fresnel rhombs as achromatic phase shifters for infrared nulling interferometry", Optics Express, vol. 15, No. 20, pp. 12850-12865 (2007).
Mach-Zehnder Interferometer printout from Wikipedia, pp. 1-6 (2019).
Pupeza et al., "Field-Resolved Spectroscopy in the Molecular Fingerprint Region", 2017 European Conference on Lasers and Electro-Optics—European Quantum Electronics Conference (Optical Society of America, 2017), paper CH-2.4.
Pupeza et al., "Field-resolved infrared spectroscopy of biological systems", Nature, vol. 577, pp. 52-71 (2020).
Scotoni et al., "Simultaneous detection of ammonia, methane and ethylene at 1.63 um with diode laser photoacoustic spectroscopy", Appl. Phys. B., vol. 82, pp. 495-500 (2006).
Serabyn et al., "Fully symmetric nulling beam combiners", Applied Optics, vol. 40, No. 10, pp. 1668-1971 (2001).
Tonouchi et al., "Cutting-edge terahertz technology", Nature Photonics, vol. 1, pp. 97-105 (2007).
Udem et al., "Optical frequency metrology", Nature, vol. 416, pp. 233-237 (2002).
Ye et al., "Femtosecond Optical Frequency Comb Technology", 373 pages (2005).
Guan et al., "Quasi zero-background tunable diode laser absorption spectroscopy employing a balanced Michelson interferometer", Optics Express, vol. 16, No. 26, pp. 21714-21720 (2008).
Office Action for related Japanese Patent Application No. JP2021-500220 dated Mar. 8, 2022.
English abstract of CN101806733A.

* cited by examiner

INTERFEROMETRY WITH AN ACHROMATIC INTERFEROMETRIC SUPERPOSITION OF ELECTROMAGNETIC FIELDS

CROSS-REFERENCE TO RELATED APPLICATIONS

This application is a U.S. National Phase Application of PCT/EP2018/069229, filed Jul. 16, 2018, the contents of which application are incorporated herein by reference in their entireties for all purposes.

FIELD OF THE INVENTION

The invention relates to an interferometer apparatus and to an interferometric method for an achromatic interferometric superposition of electromagnetic fields, in particular utilizing a dual beam path interferometer. Furthermore, the invention relates to an interferometric measurement apparatus and an interferometric measurement method, utilizing the interferometer apparatus and the interferometric measurement apparatus. Applications of the invention are available e. g. in the fields of investigations of radiation-matter interactions, e. g. for measuring spectral responses of samples, spatial distributions of electromagnetic fields and testing optical components.

TECHNICAL BACKGROUND

In the present specification, reference is made to the following prior art illustrating technical background of the invention and related techniques:
1. J. P. Dakin, H. O. Edwards, and B. H. Weigel, Sensors Actuators B 29, 1(1995).
2. H. R. Chandrasekhar, L Genzel, and J. Kuhl, Opt. Commun. 17, 1 (1976).
3. Z. Guan, M. Lewander, and S. Svanberg, Opt. Express 16, 26 (2008).
4. V. V. Goncharov, and G. E. Hall, Opt. Lett. 37, 12 (2012).
5. L Genzel, and J. Kuhl, Infrared Physics 18, 2 (1978).
6. D. Kuehl, and G. P. R, Anal. Chem. 50, 3 (1978).
7. H. Bar-Lev, Infrared Physics 7, 2 (1967).
8. D. L Beduhn, and R. L White, Appl. Spectroscopy 40, 5 (1986).
9. R. Bracewell, Nature, 274, 780 (1978).
10. P. Gabor, "A study of the performance of a nulling interferometer," Université Paris Sud—Paris XI, Paris, (2009).
11. E. Serabyn, and M. Colavita, Appl. Opt. 40, 10 (2001).
12. J. Gay, and Y. Rabbia, C. R. Acad. Sci. Paris 322, 3 (1996).
13. D. Mawet, C. Hanot, C. Lenaerts, P. Riaud, D. Defree, D. Vandormael, J. Loicq, K. Fleury, J.-Y. Plesseria, J. Surdej, and S. Habraken, Opt. Express 15, 20 (2007).
14. J. Hayden, S. Hugger, F. Fuchs and B. Lendl, Appl. Phys. B, 124, 29, (2018).
15. T. W. Haensch, and B. Couillaud, Opt. Commun. 35, 3, (1980).
16. D. Fehrenbacher, P. Sulzer, A. Liehl, T. Kälnerer, C. Riek, D. V. Seletskyi, and A. Leitenstorfer, Optica 2, 10 (2015).
17. M. Scotoni, A. Rossi, D. Bassi, R. Buffa, S. Iannotta, and A. Boschetti, Appl. Phys. B 82, 3 (2006).
18. A. Loberau, and W. Kaiser, Rev. Mod. Phys. 50, 3 (1978).
19. T. Udem, R. Holzwarth, and T. Hänsch, Nature 416, 233 (2002).
20. J. Ye, and S. T. Cundiff, *Femtosecond Optical Frequency Comb Technology* (Springer, 2005).
21. M. Tonouchi, Nat. Phot. 1, 2 (2007).
22. I. Coddington, W. C. Swann, and N. R. Newbury, Opt. Lett. 35, 9 (2010).
23. A. A. Lanin, A. A. Voronin, A. B. Fedotov, and A. M. Zheltikov, Sci. Rep. 4 (2014).
24. I. Pupeza, M. Huber, W. Schweinberger, M. Trubetskov, S. A. Hussain, L. Vamos, O. Pronin, F. Habel, V. Pervak, N. Karpowicz, M. Zigman, and F. Krausz in 2017 *European Conference on Lasers and Electro-Optics—European Quantum Electronics Conference* (Optical Society of America, 2017), paper CH-2.4.

In traditional spectroscopic techniques, the signal associated with a process under scrutiny manifests as change of the radiation source intensity (or field). This imposes two main limitations on the smallest detectable signal: Firstly, its magnitude is lower-bound by excess source noise. Secondly, resolving a small change of a comparatively large signal requires high-dynamic-range detection.

Optically subtracting a reference signal before detection isolates the sought-for signal changes and can mitigate both limitations. Technically, this can be realized by an interferometer in whose arms the propagation of light differs precisely by the process under scrutiny [1]. Ideally, in the interferometer port combining both arms with opposing phase, only the (miniscule) differences survive destructive interference [2]. In doing so, the effect of any excess source noise on the detection limit can be principally suppressed down to the shot-noise level [3, 4]. At the same time, the cancellation of the—usually orders of magnitude stronger—reference signal relaxes dynamic range requirements of detectors and digitization electronics [5, 6]. Thus, the excitation intensity can exceed the saturation limit of the detector by far, boosting the amplitude of the detected sample response. Because sequential measurements of sample and reference signal become unnecessary, measurement time and systematic errors are reduced [7, 8]. In addition to these advantages, optical subtraction facilitates the direct comparison of two samples by increasing the visibility of slight differences between them.

To adapt optical nulling for broadband frequency-domain and time-domain spectroscopy (which by definition is broadband) the challenge of simultaneous cancellation of super-octave spectra has to be tackled. Several solutions for achromatic phase shifting have been developed in the field of observational astronomy [10]. For instance, a pair of mirror-symmetric periscopes can be used to implement a geometric phase shift [11], the Gouy phase shift introduced by an additional focus in one arm can be exploited [12], and a pair of right-angle Fresnel rhombs works like achromatic quarter-wave plates [13]. However, all these concepts are either technically complex or not suitable for ultrashort-pulse applications.

An interferometric concept for optical nulling has been suggested by Hayden et al. [14] for spectral absorption and dispersion measurements of a liquid sample. However, this technique is restricted to measurements with a tunable narrowband laser, but not suitable for broadband measurements with ultrashort pulses.

OBJECTIVE OF THE INVENTION

The objective of the invention is to provide an improved interferometer apparatus, an improved interferometric method, an improved interferometric measurement apparatus and/or an improved interferometric measurement method, using an achromatic interferometric superposition of electromagnetic fields and being capable of avoiding limitations and disadvantages of conventional techniques. In particular, the interferometric techniques are to be capable of an achromatic interferometric superposition, in particular subtraction and/or summation, of electromagnetic fields with a broadband spectrum, in particular with increased extinction capability, sensitivity and/or SNR.

SUMMARY OF THE INVENTION

These objectives are solved by apparatuses and/or methods of the invention.

According to a first general aspect of the invention, the above objective is solved by an interferometer apparatus, being configured for an achromatic interferometric superposition of electromagnetic fields, with a dual beam path interferometer, comprising a beam splitter device and a beam combiner device. The beam splitter device (in the following: beam splitter, e. g. a transparent plate) is capable of splitting an input beam into a first beam propagating along a first interferometer arm and a second beam propagating along a second interferometer arm, wherein the first and second interferometer arms have an identical optical path length. The beam combiner device (in the following: beam combiner, e. g. a transparent plate) is capable of recombining the first and second beams into a constructive output and a destructive output. The destructive output (or: difference output) represents a difference of the electromagnetic fields travelling along the first and second interferometer arms, and the constructive output (or: sum output) represents a sum of the electromagnetic fields travelling along the first and second interferometer arms. Each of the first and second interferometer arms includes at least one deflection mirror, directing the beam path of the respective interferometer arm from the beam splitter to the beam combiner.

The input beam propagating to the beam splitter and being split into the first and second beams as well as each of the first and second beams are deflected by Fresnel reflections. Fresnel reflections occur at reflective surfaces of either an optically dense medium or an optically thin medium. Fresnel reflections occur at uncoated surfaces. With a Fresnel reflection off an optically dense medium, the electromagnetic field propagates through an optically thin medium (medium with lower refractive index), like a gas, e. g. air, or a vacuum, to an optically dense medium (medium with higher refractive index), like a transparent plate, where the reflection occurs. In this case, the reflected field has a phase difference of n compared with the incident field. This phase difference of n is effective for all wavelengths included in the electromagnetic radiation of the first and second beams. The Fresnel reflection off the optically dense medium occurs e. g. at the outer surfaces of the beam splitter or beam combiner or at the deflection mirrors. With a Fresnel reflection off an optically thin medium, the electromagnetic field propagates through an optically dense medium, like a transparent plate, to an optically thin medium, like a gas, e. g. air, or a vacuum, where the reflection occurs. In this case, the reflected field has no phase difference compared with the incident field. The Fresnel reflection off the optically thin medium occurs e. g. at the inner surfaces of the beam splitter or beam combiner.

According to the invention, the dual beam path interferometer is configured such, in particular the reflective surfaces of the beam splitter and the beam combiner are arranged such that, in the first interferometer arm compared with the second interferometer arm, one additional Fresnel reflection off an optically dense medium is provided. In the contribution of the two interferometer arms to the destructive port, one more Fresnel reflection off an optically dense medium occurs in the first interferometer arm. Accordingly, a propagation of the electromagnetic fields of the first and second beams results in a wavelength-independent phase difference of $\pi$ between the contributions of the two interferometer arms to the destructive port. This is in contrast to [14], where beam splitting and beam combination are realized at a coated surface, which cannot provide a wavelength-independent phase difference of n because the coating prevents a zerophase-shift reflection off the second surface.

Accordingly, in other words, reflective surfaces of the beam splitter and the beam combiner are arranged such that, the number of reflections and the number of transmissions experienced by the electromagnetic fields propagating in the first and the second interferometer arms are balanced in the destructive port, wherein a propagation of the electromagnetic fields of the first and second beams differs by one additional reflection off an optically dense medium in the first interferometer arm and results in the wavelength-independent phase difference of n between the contributions of the two interferometer arms.

Reflections of the electromagnetic radiation occur at uncoated surfaces of the beam splitter and beam combiner, when the Fresnel reflection off the optically dense medium is provided.

Furthermore, according to the invention, the first interferometer arm includes a balancing transmission element being arranged for balancing a chromatic dispersion and Fresnel losses in the first and second interferometer arms. The inventive dual beam path interferometer is similar to a Mach-Zehnder interferometer, but the number of reflections and the number of transmissions experienced by the electromagnetic fields propagating in the first and the second interferometer arms is balanced in the destructive port, resulting in additional transparent media passed by the second beam in the second interferometer arm. Advantageously, the balancing transmission element compensates for effects of these additional transparent media. Preferably, the balancing transmission element comprises a transparent plate. Preferably, the balancing transmission element is not moved during any measurement, i. e. it has a fixed position and orientation throughout the whole measurement.

The electromagnetic fields comprise e. g. light with a wavelength in the UV, VIS and/or IR range or radiation in other wavelength ranges with wavelengths e. g. up to 100 μm. The electromagnetic field have a broadband spectrum, spanning a frequency interval of at least 1% of an octave up to one octave or more, like several octaves, e. g. up to 3, 4 or 5 octaves. The electromagnetic fields may comprise pulsed laser light or thermal radiation with a coherence length above the optical path length of the first and second interferometer arms.

Advantageously, Mach-Zehnder-like interferometer is provided, with an unprecedented combination of bandwidth (e. g. 950 nm-2100 nm) and intensity suppression ($4\times10^{-4}$). Compared to the more complex approaches developed for the direct observation of extrasolar planets [9], the inventive concept for achromatic nulling solely relies on the combination of Fresnel reflections off boundaries between optically less dense to denser media and vice versa. In practical tests of differential molecular fingerprinting, the inventors spatially isolated the resonant response of a molecular sample to an impulsive $\chi^{(1)}$ excitation from the instantaneous response, carrying negligible fingerprint information. With a methane gas sample in one interferometer arm, the inventors spatially isolate the coherent molecular vibrational emission from the broadband, impulsive excitation. This renders the detection sensitivity largely immune to source intensity fluctuations, resulting in an improvement of two orders of magnitude in detectable concentration compared to direct transmission geometry. The novel concept will benefit sensing applications requiring high detection sensitivity and dynamic range, including time-domain and frequency-domain spectroscopy.

A phase shift between two interferometer arms can be achieved by delaying one beam with respect to the other. The acquired phase shift $\Delta \varphi$ is given by:

$$\Delta \varphi = 2\pi \frac{\Delta l}{\lambda}, \quad (1)$$

where $\Delta l$ is the difference in optical path length and $\lambda$ the wavelength. For broadband destructive interference, a wavelength-independent phase shift of $\pi$ between the interfering electromagnetic fields is provided. As Eq. (1) shows, the phase shift due to mutual delaying, however, always would be wavelength-dependent. On the contrary, the invention uses a wavelength-independent phase shift.

According to a second general aspect of the invention, the above objective is solved by an interferometric measurement apparatus, comprising an interferometer apparatus according to the first general aspect of the invention, a radiation source being arranged for creating the input beam, and a first detection device being arranged for detecting the destructive output. The radiation source may comprise e. g. a pulsed laser or a thermal radiation source with a coherence length above the optical path length of the first and second interferometer arms, e. g. a thermal source combined with a spatial filter increasing the coherence length.

According to a third general aspect of the invention, the above objective is solved by an interferometric measurement method, utilizing an interferometer apparatus according to the first general aspect of the invention and/or the interferometric measurement apparatus according to the second general aspect of the invention, comprising the steps of arranging a sample to be investigated in one of the first and second interferometer arms, arranging a reference sample in the other one of the first and second interferometer arms, creating the input beam and irradiating the sample and the reference sample, and sensing at least one of the constructive output and the destructive output of the beam combiner. The interferometric measurement method can include an achromatic interferometric subtraction of the electromagnetic fields of the first and second beams, and/or an achromatic interferometric summation of the electromagnetic fields of the first and second beams.

The inventive interferometric measurement method may include any radiation-matter interaction, e. g. a linear or a non-linear interaction. In particular, the interferometric measurement method may include an absorption (or transmission) measurement, sensing a resonant remission after absorption of radiation, investigating reflectivity of an optical component or geometric shape of a component. The sample can be arranged in the interferometer for a measurement in transmission or for a measurement in reflection (in this case, additional deflection mirrors are used for folding the interferometer arms). The sample can be arranged in a container, e. g. a cell, or without a container. The reference sample comprises a subject similar to the sample, but without a component to be investigated.

Preferably, the beam splitter and the beam combiner have a thickness providing a displacement of beams reflected at the first and second surfaces thereof such that a spatial separation of partial beams is possible. Thus, according to a preferred embodiment of the invention, at least one spatial filter is arranged for suppressing the electromagnetic fields in at least one of the first and second interferometer arms, which do not have opposing phases. A thickness which allows the spatial separation of beams being reflected off the first and the second surfaces of the beam splitter and the beam combiner is selected in dependency on the beam size, the angle of incidence and the refractive index of the beam splitter and the beam combiner. With an example, the beam splitter and the beam combiner have a thickness of at least 0.1 mm, particularly preferred at least 3 mm and/or at most 10 mm, particularly preferred at most 5 mm.

Preferably, the beam splitter and the beam combiner are plane transparent plates made of e. g. zinc selenide, chemical vapor deposition diamond, borosilicate crown-glass, UV-grade fused silica and high resistivity float zone silicon.

Alternatively or additionally, at least one anti-reflective coating can be arranged on at least of the reflective surfaces of the beam splitter and the beam combiner, which are not used for Fresnel reflections, also allowing a suppression of the electromagnetic fields in at least one of the first and second interferometer arms.

According to a preferred embodiment of the invention, the additional Fresnel reflection off the optically dense medium is provided at the beam splitter.

According to an alternative advantageous embodiment of the invention, the additional Fresnel reflection off the optically dense medium is provided at the beam combiner.

According to a further preferred embodiment of the invention, a stabilization device can be arranged for controlling the interferometer such that both arms are identical up to effects caused by interaction with the sample, e. g. by controlling at least one of the optical path length, a mirror position and a mirror orientation. The stabilization device acts on at least one optical component, in particular deflection mirror of the interferometer. Advantageously, the stabilization device facilitates a long term stable operation of the inventive apparatus. Preferably, the stabilization device includes a feedback loop control coupled with the constructive output.

If, according to a further preferred embodiment of the invention, the dual beam path interferometer is arranged in an evacuated environment, distortions of beam propagation in the interferometer arms, e. g. by air or other gases, can be suppressed.

According to a further advantageous embodiment of the invention, the first and second interferometer arms can be configured with multiple deflection mirrors such that they cross each other in space. Beam-folding in the interferometer has an advantage in terms of providing a reduced distance of the first and second interferometer arms at a sample irradiation position, such that one single measuring subject, e. g. one common sample container including the sample to be measured and a reference sample in different compartments can be arranged at the sample irradiation position for simultaneous propagation by the first and second beams.

According to a further preferred embodiment of the invention, at least one phase setting element can be arranged in at least one of the input beam, the destructive output and the constructive output. The phase setting element may comprise e. g. one or more chirped mirrors or an additional dispersive material. The phase setting element allows a compression of pulses of the input beam at the irradiation position of the sample and/or a shaping of the temporal pulse shape at the detector device, e. g. for minimizing the full width at half maximum or providing a rapid intensity decrease at the end of the pulses. Alternatively or additionally, an imaging optic can be arranged for shaping the transverse profile of the electromagnetic field in the first and second interferometer arms. Preferably, the imaging optic is arranged for shaping the transverse profile of the electromagnetic field of at least one of the input beam, the destructive output and the constructive output. Particularly preferred, the imaging optic is arranged for focusing the input beam into the interferometer, e. g. to an irradiation position of a sample. Advantageously, this allows to increase the local intensity and the magnitude of investigated non-linear interactions of the radiation with matter.

According to a preferred embodiment of the inventive interferometric measurement apparatus, a second detection device can be arranged for detecting the constructive output. Advantageously, the second detection device can be combined with the stabilization device for stabilizing the interferometer.

BRIEF DESCRIPTION OF THE DRAWINGS

Further advantages and details of the invention are described in the following with reference to the attached drawings, which schematically show in.

DETAILED DESCRIPTION OF PREFERRED EMBODIMENTS OF THE INVENTION

Figure 1:
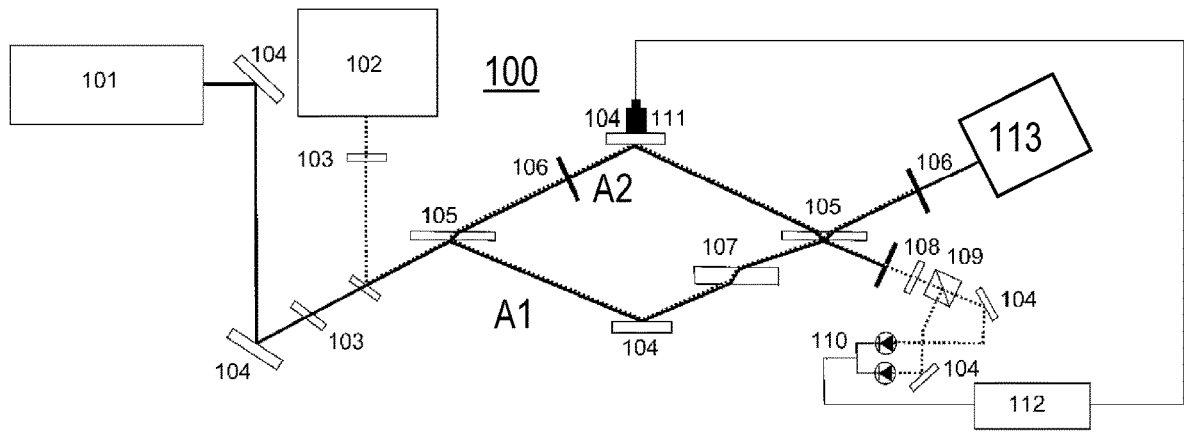
FIGS. 1 to 4: embodiments of the inventive interferometer apparatus and/or an inventive interferometric measurement apparatus.
Figure 2:
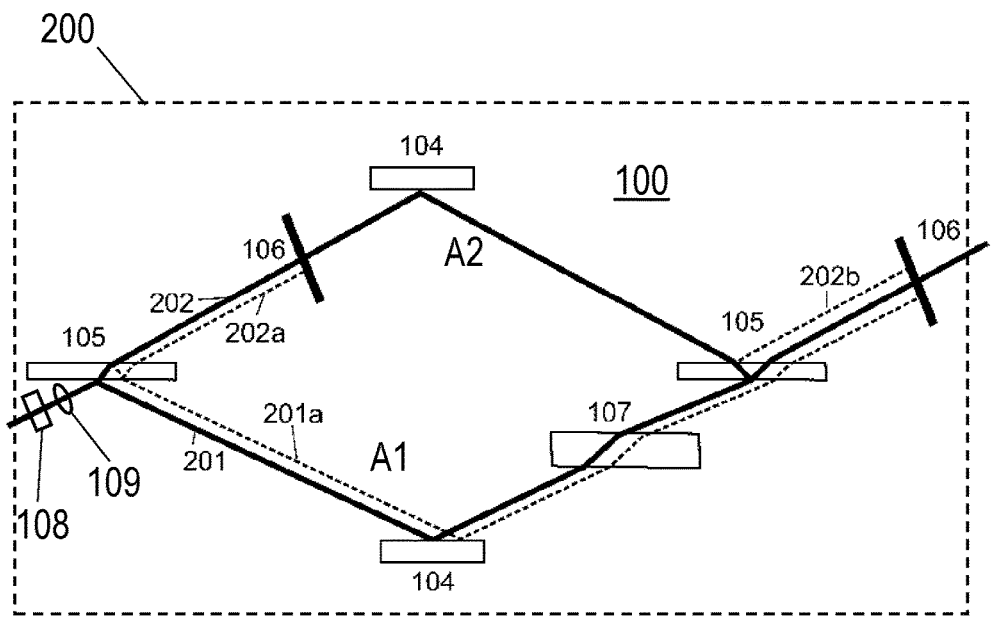
Figure 5:
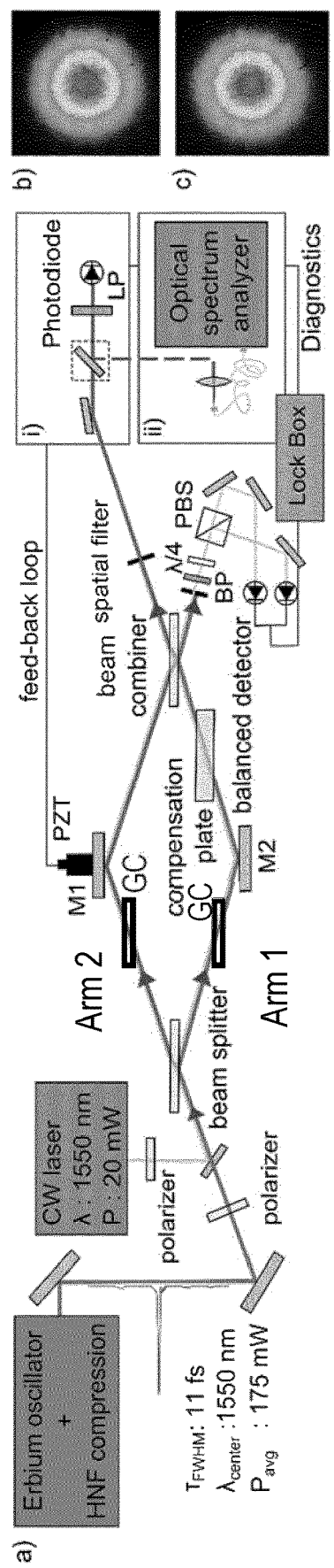
FIG. 5: an embodiment of the inventive interferometric measurement apparatus.

FIG. 1 shows an embodiment of the inventive interferometer apparatus 100, comprising a broadband laser source 101, an auxiliary laser 102, wire grid polarizers 103, deflection mirrors 104, transparent plates 105, spatial filters 106, a compensating plate (balancing transmission element) 107, a quarter wave plate 108, a polarizing beam splitter 109, a balanced detector 110, a piezo electric transducer 111 for shifting the deflection mirror 104, and locking electronics 112. 113 is a detector device, like a spectrometer or a device for time resolved spectroscopy, for detecting the destructive output of the beam combiner 105. FIG. 2 shows details of the beam path in the interferometer apparatus 100 of FIG. 1, wherein 201 is the first reflection of the beam splitter 105, 201a is a second reflection of beam splitter 105, 202 is a transmission of the beam splitter 105, 202a is a third reflection of beam splitter 105, and 202b is a first reflection of beam combiner 105. Due to the selection of reflections, in particular the first reflection 201 of the beam 10 combiner 105 and the second reflection of the beam combiner 105, a phase difference of $\pi$ between the contribution from the interferometer arms A1 and A2 is introduced in the destructive output. With the spatial filters 106, other reflections at the beam splitter and beam combiner 105 are blocked. The interferometer apparatus 100 is arranged in an evacuated environment 200 as schematically shown by example in FIG. 2. Furthermore, a phase setting element 108 and an imaging optic 109 are arranged in the input beam of the interferometer apparatus 100. Further details of the operation of the interferometer apparatus 100 are described with reference to FIG. 5.

Figure 3:
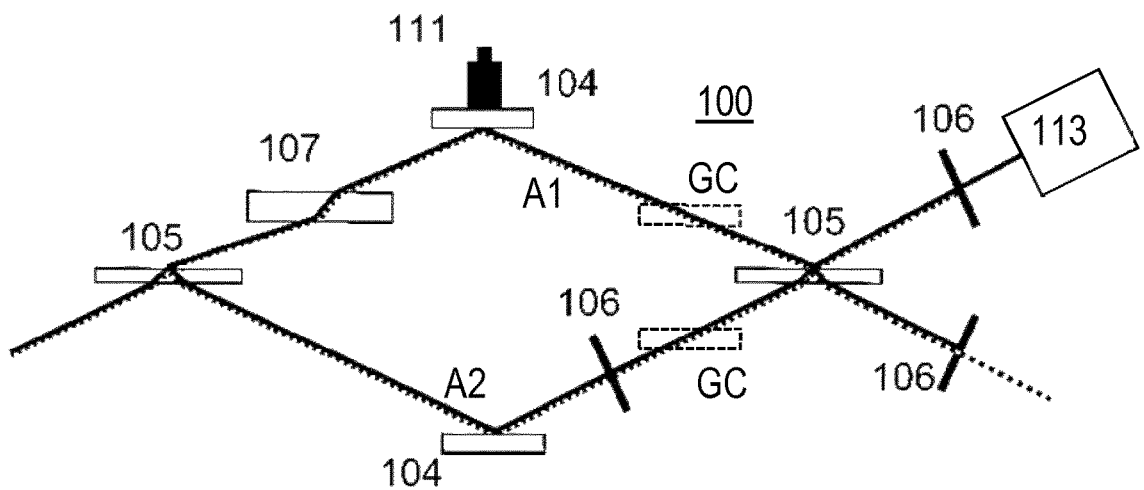

FIG. 3 shows an alternative embodiment of the inventive interferometer apparatus 100 with a mirrored arrangement of the optical components compared with the embodiment of FIGS. 1 and 2. Components 104, 105, 106, 107, 111 and 113 refer to same parts like in FIG. 1. The gas cells GC are schematically illustrated for showing a configuration of an interferometric measurement apparatus.

Figure 4:
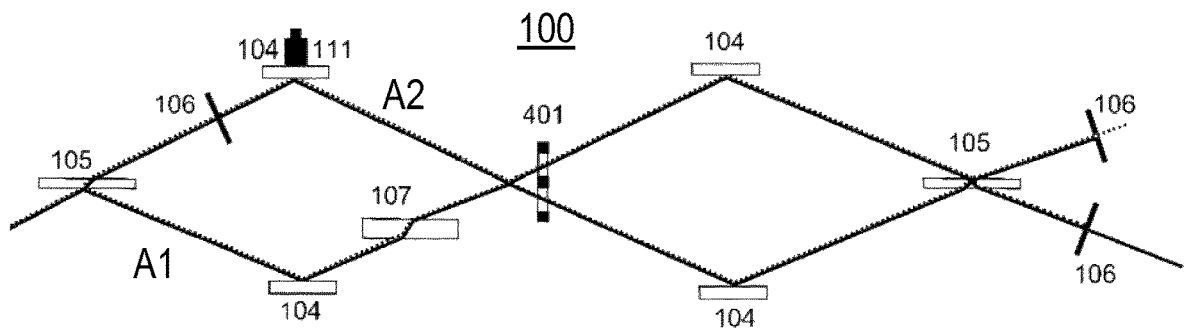

FIG. 4 shows another alternative embodiment of the inventive interferometer apparatus 100 with crossed interferometer arms A1 and A1. Components 104, 105, 106, 107, and 111 refer to same parts like in FIG. 1. 401 is a sample cell with two compartments.

FIG. 5a shows a Mach-Zehnder-like interferometer: Light entering the interferometer is partially reflected and partially transmitted at the first surface of the beam splitter. The reflected part passes through the compensation plate (balancing transmission element) and is partially reflected off the first surface of the beam combiner. The transmitted part is partially reflected off the second surface of the beam combiner. The destructive port (providing destructive output) of the interferometer is sent to the diagnostics (detector device), whereas the constructive port (providing constructive output) is used for stabilization, e. g. to generate a Hänsch-Coulliaud error signal from an auxiliary laser (CW laser). Through the interferometer, e. g. 11-fs pulses are propagated spanning from 950 nm to 2100 nm, generated from an erbium fiber oscillator. BP: Band pass filter, FWHM=12 nm at 1550 nm. PBS: Polarizing beam splitter. LP: 950 nm longpass filter. FIG. 5b shows a beam profile in interferometer arm 1, and Figure 5c shows a beam profile in interferometer arm 2.

With further details, the experimental setup is sketched in 5a. Apart from two essential changes, the setup is equivalent to a Mach-Zehnder interferometer. In the latter, the achromatic phase difference of n between the interferometer arms is caused by the fundamental property of light waves undergoing no phase change when reflected off a boundary to a medium with lower refractive index. However, light propagating to the destructive port of a conventional Mach-Zehnder interferometer is reflected three times in one arm and transmitted twice and reflected once in the other arm. For broadband radiation, refractive index variations lead to imperfect cancellation. The inventors avoid this shortcoming of a conventional Mach-Zehnder interferometer by destructively combining an equal number of reflections and transmissions in each arm. The resulting additional material passage in arm 2 is compensated by adding a window (balancing transmission element) twice as thick as the beam combiner in arm 1. In the upper output of the interferometer in FIG. 5a, the interfering light has opposing phase because the light is reflected off the first surface of the beam splitter in arm 2 and off the second surface of the beam combiner in arm 1. FIGS. 5b and 5c show the beam profiles of arm 1 and 2, respectively, recorded in the destructive port, while the other arm was blocked, and after spatial filtering.

The interferometer employs plain, 3-mm thick borosilicate crown glass (N-BK7) windows for beam splitting and combining. The substrate thickness and material were chosen to provide reasonable spatial separation between the reflection off the first and the second surface for spatially filtering undesired multiple reflections. The angle of incidence on the windows is 60, providing a reflectivity of approximately 18% for s-polarized light which is close to the optimum splitting ratio of 20:80 maximizing the power entering the destructive port. Due to the mirror symmetry of the interferometer, small beam pointing fluctuations of the incident light do not affect the extinction.

For stabilization of the optical path difference (OPD) the length of arm 1 is controlled via a feed-back loop acting on a piezo electric transducer (PZT). The Hänsch-Coulliaoud error-signal [15] is generated using an auxiliary laser which exactly follows the beam path of the main laser, with an offset in beam height. The input polarization of the auxiliary laser is linear with 45° rotation with respect to the propagation plane, so that both arms acquire a polarization change in the constructive port where arm 1 is transmitted twice and arm 2 is reflected twice.

The test experiments were carried out with a super-octave spectrum generated from a commercial erbium fiber oscillator operating at 56 MHz. In a highly nonlinear fiber (HNF) (for details see [16]) the 90-fs pulses from the oscillator were spectrally broadened and temporally compressed to 11-fs pulses, spanning a spectrum between 950 nm and 2100 nm with 175 mW of average power.

Besides equal arm length, the alignment of the optical components within the interferometer is critical for achromatic nulling. Ideally, all optical components should be parallel to each other and substrate thicknesses should match to minimize the influence of beam pointing, intensity and dispersion unbalance, and suboptimal spatial overlap.

Figure 6:
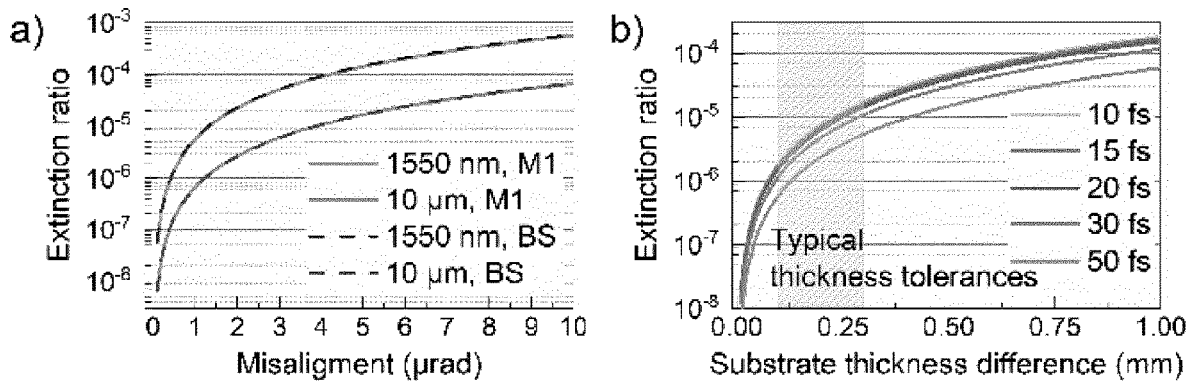
FIGS. 6 to 8: illustrations of experimental results obtained with the setup of FIG. 5.

FIG. 6a shows the simulated decrease of extinction ratio for misalignment of two different optical elements in the interferometer at 1550 nm and 10-μm central wavelength. FIG. 6b shows the simulated decrease of extinction ratio depending on the difference in substrate thickness of beam splitter and beam combiner for different input pulse durations. Shaded area: typical thickness tolerances specified by the manufacturer.

With more details, FIG. 6a shows the calculated influence of angular misalignment on the spatial overlap of both arms after recombination, which translates directly into a degradation of the extinction ratio. According to the inventor's calculations, a misalignment of any optical element has the same quantitative influence on the extinction ratio. The shown values correspond to the experimental arm length of 30 cm. For longer arm length the alignment sensitivity increases. With the precision of commercially available motorized kinematic mounts (1 μrad) an extinction ratio of $6 \times 10^{-6}$ for a central wavelength of 1550 nm and $6 \times 10^{-7}$ for 10-μm central wavelength is in principle attainable if only the spatial overlap is considered. Additionally to the alignment, the extinction ratio is influenced by dispersive effects owing to the limited precision of the substrate thickness. FIG. 6b shows that the influence of substrate thickness mismatch decreases for increasing pulse duration. The shaded orange area corresponds to thickness tolerances typically specified by manufacturers. If the worst combination of thickness mismatch (0.9 mm between arm 2 and 1) is considered, the extinction ratio for 10-fs input pulses is limited to $2 \times 10^{-4}$.

Figure 7:
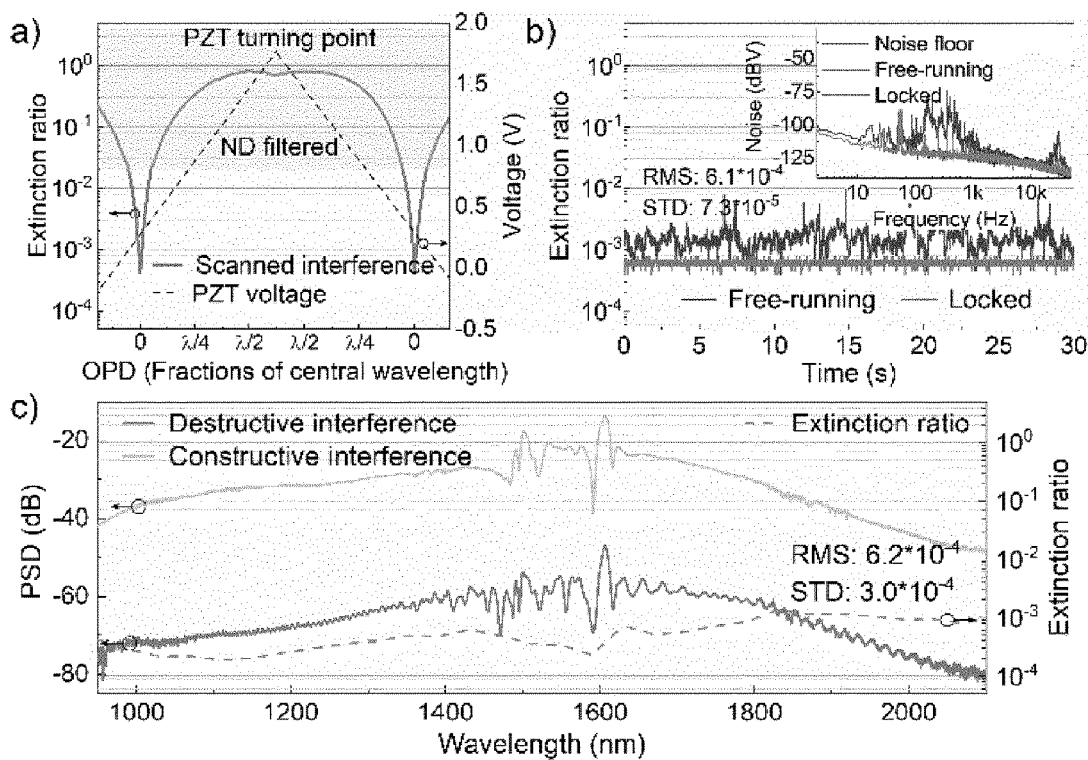

FIG. 7a shows an extinction ratio measured with a photo diode when the optical path difference is scanned across zero with the PZT. Yellow shaded area: Neutral density filter was applied. FIG. 7b shows an extinction ratio measured with a photo diode for the free-running interferometer and the interferometer locked via the Hänsch-Couillaud error signal. The inset shows the frequency-resolved signals and the noise floor of the spectrum analyzer. FIG. 7c shows spectrally resolved constructive and destructive interference. The modulation of the destructive interference spectrum at constant frequency corresponds to the thickness of the beam splitter/combiner and can be explained by imperfect spatial filtering of multiple reflections in the substrate(s). The dashed curve shows the extinction ratio between lower and upper spectrum, calculated by integration of 40-nm steps.

In the test, the performance of the interferometer was characterized by recording the signal at the destructive port with a photodiode (PD) while applying a saw tooth voltage to the PZT to scan the OPD across zero. Far from OPD=0 a calibrated neutral density filter was applied to ensure a linear response of the PD. To convert the measured voltage into the extinction ratio, the voltage for constructive interference had to be calculated. Ideally, the interfering fields $E_1$ and $E_2$ are identical and the following holds:

$$I_{con} = |E_1 + E_2|^2 = |2E_1|^2 = 4I_1, \tag{2}$$

where $I_{con}$ is the intensity of the ideal constructive interference and $I_1$ is the intensity of one arm.

The inventors measured the voltage corresponding to the intensity of one arm and divided the recorded signal during destructive interference by four times this value. FIG. 7a shows the resulting extinction ratio and the PZT voltage. The extinction ratio reaches a minimum of $4.2 \times 10^{-4}$. This value is in good agreement with the computed values taking into account the limited precision of manual alignment. It is worth noting that broadband constructive interference cannot be reached in the port designed for destructive interference, because a modification of the OPD will result in a wavelength-dependent phase difference between the two interferometer arms. This explains why the maximum of the PD signal is less than 1. FIG. 7b shows a comparison between the locked and the free-running PD signal at the destructive port of the interferometer on a time-scale of 30 s. In the locked state, the root mean square (RMS) value of the extinction ratio is $6.1 \times 10^{-4}$. The discrepancy between the scanned and the locked extinction ratio is most likely caused by differing air fluctuations in the two arms of the interferometer. The inset to FIG. 7b shows the frequency-resolved fluctuations of the destructive port in the locked and the free-running state up to 50 kHz. Above 50 kHz both signals reach the noise level of the radio-frequency (RF) analyzer. The common peak at 50 Hz can be attributed to the power supply frequency whereas the common peak at 30 Hz is an artifact from the measurement device. Up to a few kHz the stabilization scheme reduces all fluctuations to the noise level of the RF analyzer. The significant feature at 30 kHz cannot be completely removed by the lock.

To investigate the wavelength dependence of the extinction, the stabilized signal was focused to a single-mode fiber connected to an optical spectrum analyzer (OSA). In FIG. 7c, the power spectral densities (PSD) of the destructive and the ideal constructive interference are depicted (the latter is defined as four times the PSD from a single arm). The wavelength-resolved extinction ratio is calculated by integrating the PSD in steps of 40 nm and dividing the destructive by the constructive PSD. The integration avoids extrema due to non-coinciding modulations in the two signals arising from insufficient spectral resolution of the OSA. The RMS value of the spectrally resolved extinction ratio of $6.2 \times 10^{-4}$ is in excellent agreement with that of the spectrally integrated extinction ratio determined with the PD. For this extinction ratio and an average power of 3.5 mW in one arm the calculated shot noise power of $2 \times 10^{-4}$ mW is a factor of 40 below the power in the destructive port.

Figure 8:
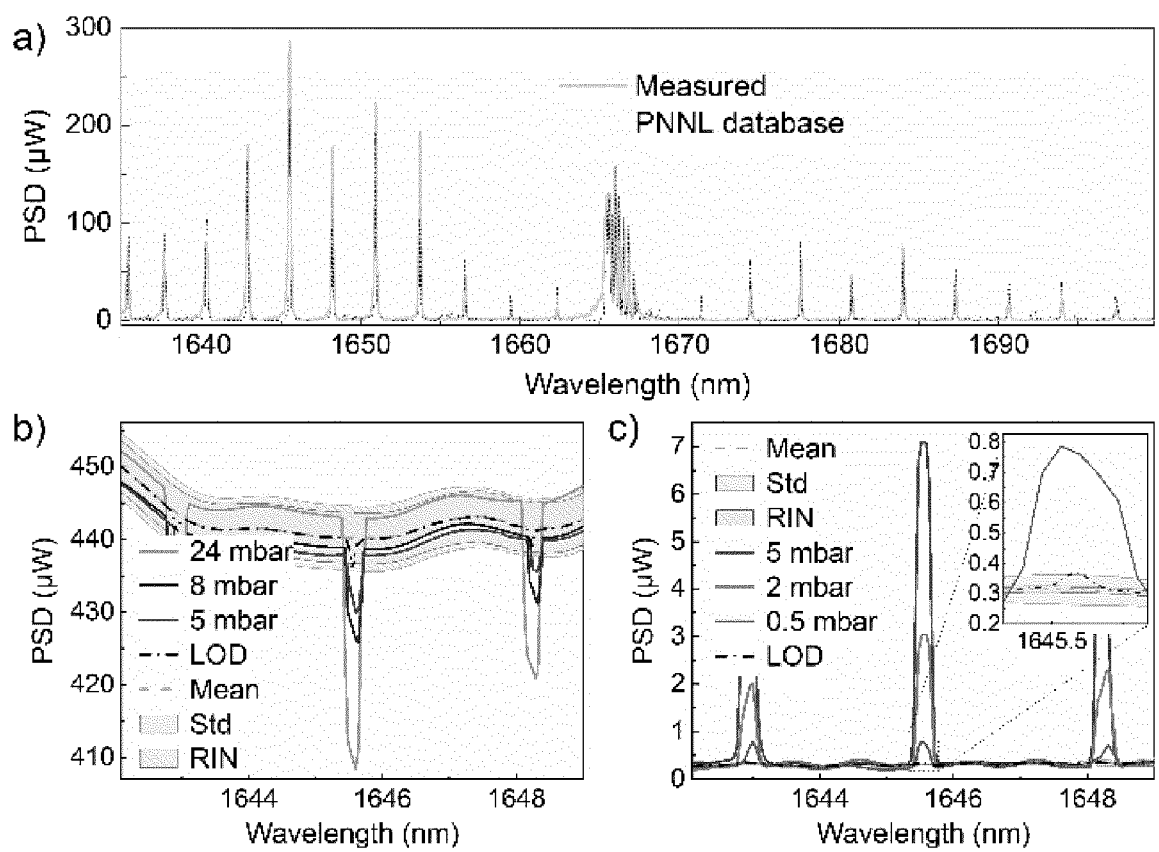

FIG. 8a shows methane resonances within the spectral coverage of our radiation source for 225 mbar methane. In the difference signal the resonant response of the methane molecules manifests as coherent emission. Dashed black line: calculated reference curve based on spectral absorbance from the PNNL database. FIG. 8b shows three dominant resonances measured with blocked reference arm for decreasing methane pressure. Outer shaded area: standard deviation of 15 reference measurements centered around the mean value. Inner shaded area: Integrated absolute intensity noise measured at the output of the single-mode fiber, which connects the interferometer output to the OSA. Dashed black line: LOD calculated using PNNL data. FIG. 8c shows the same resonances measured by destructively interfering the sample and reference arms, for decreasing methane pressure. Outer shaded area: standard deviation of 15 reference measurements of the destructive interference without methane centered around the mean value. Inner shaded area: integrated absolute intensity reduced by the extinction ratio. Dashed black line: LOD calculated using the PNNL data.

To demonstrate the potential of broadband interferometric nulling for increasing the sensitivity in broadband spectroscopy, the inventors performed methane absorption spectroscopy. To this end, the inventors placed identical gas cells GC into each arm of the interferometer. The airtight cells GC consisted of two 1-mm fused-silica windows, enclosing an 8-cm-long beam path. One of the gas cells GC (sample) was filled with methane; the other one (reference sample) was filled with ambient air and used as reference.

The invention is not restricted to this arrangement of cells. Generally, other sample containers or other samples, e. g. workpieces, like optical components to be investigated, can be provided for analysing radiation-matter interaction or characterizing a sample based on radiation-matter interaction.

FIG. 8a shows the resonances in the $2v_3$ vibrational overtone band of methane [17] within the spectral coverage of our source, measured in the interferometric configuration with 225 mbar of methane inside the sample cell. Up to a small fraction energy transferred to molecular vibrations, the instantaneous response of the methane samples is identical to the excitation and, therefore, it destructively interferes with the excitation pulse in the reference arm. Thus, the signal in the difference port mainly contains the isolated, resonant response emitted from the methane molecules [18]. For comparison, FIG. 8a shows a reference curve based on spectral absorbance from the Pacific Northwest National Laboratory (PNNL) database, which is in good agreement with the measured data. The decadic absorbance from the PNNL database was converted to $I_0(\lambda)(1-T(\lambda))$, where $I_0(\lambda)$ is the intensity contained in the reference arm and $T(\lambda)$ is the transmission of the sample. Formally, this expression corresponds to the measured difference signal.

To determine the limit of detection, three dominant methane resonances between 1642 nm and 1650 nm were observed for decreasing methane concentration. FIG. 8b shows the results for direct transmission geometry, where the reference arm was blocked. Here, the interference of the instantaneous and the phase-shifted, resonant sample response manifests itself as a depletion of the PSD at the resonance frequencies (i.e. "absorption" in classical spectroscopy). FIG. 8c shows the results for the interferometric configuration. The molecular response appears here as a spatially isolated emission of coherent radiation off the resonance frequencies. A comparison of the peak heights in both configurations reveals that nearly all absorbed radiation is reemitted as coherent radiation by the molecules. The deviation of the measured line shape from a Voigt profile (as expected under these experimental conditions) can be explained by the limited resolution of the OSA.

To determine the limit of detection (LOD) in both cases, the inventors examined the factors limiting the sensitivity in each configuration. By calculating the standard deviation of 15 reference measurements without methane, the inventors estimated the measurement uncertainty of a single measurement, respectively. Taking these values as lower bounds for the LOD, the inventors determined values of 3 mbar and 0.04 mbar for the direct transmission geometry and for the interferometric configuration, respectively. The experimentally determined values are 5 mbar and 0.5 mbar, respectively because the LOD in this case is lower-bound by the limited precision in controlling the methane pressure.

To characterize the source of the observed fluctuations, the inventors measured the relative intensity noise (RIN) of the laser before and after the fiber connecting to the OSA. The measurement reveals a RIN RMS integrated from 1 Hz to 1 MHz of 0.25% before the fiber and 0.79% after the fiber. The increased value after the fiber can be explained by beam pointing fluctuations transformed to intensity fluctuations upon fiber coupling. FIG. 8b shows that in direct transmission geometry intensity fluctuations are the main source of noise. In the interferometric configuration, the RIN is reduced by twice the extinction ratio which leads to a dominance of interferometer fluctuations as the main source of noise.

In conclusion, the inventors showed an unprecedented combination of interferometric deep nulling and broad bandwidth with a Mach-Zehnder-like interferometer. The inventors demonstrated a sensitivity improvement of two orders of magnitude for absorption spectroscopy due to strong suppression of excessive intensity noise limiting the minimal detectable concentration. In the future, the LOD can be pushed to the shot-noise limit by optimizing the quality of the optics (surface, parallelism, thickness), utilizing high-precision, motorized, kinematic mounts for alignment, and operating the system in vacuum to avoid air fluctuations.

This test of the invention demonstrates the suitability of the novel concept for a broad variety of applications. Absorption spectroscopy can directly profit from the presented increase in sensitivity. For instance, the combination with frequency-comb spectroscopy [19, 20] promises an unprecedented combination of sensitivity and spectral resolution. Another example is the combination with time-resolved detection [21, 22, 23, 24], promising fully background-free detection of molecular fingerprints, by spatial and temporal separation of the latter from an impulsive excitation.

In the following, general design consideration for the configuration of the invention are summarized, which can be implemented as single inventive feature or in any combination.

- The interferometer uses plain 3-mm thick NBK7 windows for beam splitting and beam combining (FIG. 5(a))
- The thickness and material of the substrate was chosen to have a reflectivity of approximately 20% for an s-polarized input beam and an angle of incidence (AOI) of 60° as well as reasonable spatial separation between the reflection off the first and second surface for spatial filtering of unwanted reflections
- A source is e. g. a commercial Erbium-fiber oscillator with a repetition rate of 56 MHz and 300 mW average power centered at 1550 nm
- The output of the commercial laser system is compressed in a highly nonlinear fiber (for details see [28]) to 11 fs pulses spanning from 950 nm to 2100 nm the light entering the upper port of the interferometer is reflected off the first surface of the beam splitter in arm 1 and off the second surface of the beam combiner in arm 2 the light in arm 1 passes a 6 mm thick NBK7 window to compensate the additional material passage due to the reflection off the second surface in arm 2 in the upper port of the interferometer light from arm 2 and arm 1 interferes destructively because in arm 1 the reflection off the beam splitter happens at the boundary between an optically less dense material (air) to an optically denser material (NBK7) and results in a phase change of n whereas in arm 2 the reflection off the beam combiner happens at the boundary between an optically denser material (NBK7) and an optically less dense material (air) and doesn't result in a phase change in the lower port of the interferometer light from arm 2 and arm 1 interferes constructively because in arm 2 the light is transmitted twice and in arm 1 the light is reflected off the first surface of the beam splitter and beam combiner, respectively the phase difference between both arms is $2\pi$ the according reflections are spatially filter with a vertical razor blade after each window to avoid etalon effects the interferometer only shows broadband interference if both arms have the same optical path length this is assured via an active feed-back-loop which controls the length of arm 1 with a pieezo electric transducer (PZT)

the Hänsch-Couillaud [29]error-signal for the feed-back-loop is generated from an independent auxiliary laser (cw laser, 20 mW, at 1550 nm) which exactly follows the beam path of the erbium-oscillator with an offset in beam height the input polarization of the auxiliary laser is 45° so that both arms end up with different polarizations in the constructive port after two transmissions in arm 2 and two reflections in arm 1 besides equal arm length the alignment of the optical components within the interferometer is very critical for the broadband interference ideally all optical components of the interferometer should be parallel to each other this assures that the intensity of the two arms in the destructive port is balanced and dispersive effects are identical because the AOI to all NBK7 windows is equal if all optical components are parallel also fluctuations due to beam pointing instabilities are minimized because the beam path in the two arms is exactly mirrored and the spatial overlap of the two arms is not affected.

The features of the invention disclosed in the above description, the drawings and the claims can be of significance both individually as well as in combination or subcombination for the realization of the invention in its various embodiments. The invention is not restricted to the preferred embodiments described above. Rather a plurality of variants and derivatives is possible which also use the inventive concept and therefore fall within the scope of protection. In addition, the invention also claims protection for the subject and features of the subclaims independently of the features and claims to which they refer.

The invention claimed is:

1. An interferometer apparatus, being configured for an achromatic interferometric superposition of electromagnetic fields, with a dual beam path interferometer, comprising:
    a beam splitter being arranged for splitting an input beam into a first beam propagating along a first interferometer arm including at least one deflection mirror and a second beam propagating along a second interferometer arm including at least one deflection mirror, wherein the first and second interferometer arms have an identical optical path length, and
    a beam combiner being arranged for recombining the first and second beams into a constructive output and a destructive output, wherein
    reflective surfaces of the beam splitter and the beam combiner are arranged such that, in the first interferometer arm compared with the second interferometer arm, one additional Fresnel reflection at an optically dense medium is provided and a propagation of the electromagnetic fields of the first and second beams, when recombined by the beam combiner, results in a wavelength-independent phase difference of $\pi$ between contributions of the two interferometer arms to the destructive output, and
    the first interferometer arm includes a balancing transmission element being arranged for balancing a chromatic dispersion and Fresnel losses in the first and second interferometer arms, the balancing transmission element configured to have a fixed position and orientation throughout a whole measurement.

2. The interferometer apparatus according to claim 1, further including
    at least one spatial filter being arranged for suppressing the propagation of electromagnetic fields in at least one of the first and second interferometer arms, wherein the electromagnetic fields do not have opposing phases.

3. The interferometer apparatus according to claim 1, further including
    at least one anti-reflective coating being arranged on at least one of the reflective surfaces.

4. The interferometer apparatus according to claim 1, wherein
    the additional Fresnel reflection at the optically dense medium is provided at the beam splitter.

5. The interferometer apparatus according to claim 1, wherein
    the additional Fresnel reflection at the optically dense medium is provided at the beam combiner.

6. The interferometer apparatus according to claim 1, further including
    a stabilization device being arranged for controlling at least one of the optical path lengths, a mirror position, a mirror orientation, a beam splitter position, a beam splitter orientation, a beam combiner position, a beam combiner orientation and a balancing transmission element orientation.

7. The interferometer apparatus according to claim 6, wherein
    the stabilization device includes a feedback loop control coupled with one of the constructive and the destructive outputs.

8. The interferometer apparatus according to claim 1, wherein
    the dual beam path interferometer is arranged in an evacuated environment.

9. The interferometer apparatus according to claim 1, wherein
    the balancing transmission element comprises a transparent plate.

10. The interferometer apparatus according to claim 1, wherein the first and second interferometer arms cross each other in space.

11. The interferometer apparatus according to claim 1, further including
at least one phase setting element being arranged in at least one of the input beam, the destructive output and the constructive output.

12. The interferometer apparatus according to claim 1, further including
an imaging optic being arranged for shaping a transverse profile of the electromagnetic field in the first and second interferometer arms.

13. The interferometer apparatus according to claim 12, wherein
the imaging optic is arranged for shaping the transverse profile of the electromagnetic field of at least one of the input beam, the destructive output and the constructive output.

14. An interferometric measurement apparatus, comprising
an interferometer apparatus according to claim 1,
a radiation source being arranged for creating the input beam having a broadband spectrum, and
a first detection device being arranged for detecting the destructive output.

15. The interferometric measurement apparatus according to claim 14, wherein
the radiation source comprises a pulsed laser or a thermal radiation source with a coherence length above the optical path length of the first and second interferometer arms.

16. The interferometric measurement apparatus according to claim 14, further including
a second detection device being arranged for detecting the constructive output.

17. An interferometric measurement method, utilizing an interferometer apparatus according to claim 1, comprising the steps of:
arranging a sample to be investigated in one of the first and second interferometer arms,
arranging a reference sample in the other one of the first and second interferometer arms,
creating the input beam having a broadband spectrum and irradiating the sample and the reference sample, and
sensing at least one of the constructive output and the destructive output of the beam combiner, wherein the balancing transmission element has the fixed position and orientation throughout the whole measurement.

18. The interferometric measurement method according to claim 17, wherein
the sensing at least one of the constructive output and the destructive output of the beam combiner includes sensing the destructive output of the beam combiner, the sensing the destructive output including an achromatic interferometric subtraction of the electromagnetic fields.

19. The interferometric measurement method according to claim 17, wherein
the sensing at least one of the constructive output and the destructive output of the beam combiner includes sensing the constructive output of the beam combiner, the sensing the constructive output including an achromatic interferometric summation of the electromagnetic fields.

* * * * *